United States Patent
Logue et al.

(10) Patent No.: US 6,647,421 B1
(45) Date of Patent: Nov. 11, 2003

(54) METHOD AND APPARATUS FOR DISPATCHING DOCUMENT REQUESTS IN A PROXY

(75) Inventors: Jay D. Logue, San Jose, CA (US); Lee S. Mighdoll, San Francisco, CA (US)

(73) Assignee: WEBTV Networks, Inc., Mountain View, CA (US)

( * ) Notice: Subject to any disclaimer, the term of this patent is extended or adjusted under 35 U.S.C. 154(b) by 45 days.

(21) Appl. No.: 10/016,412

(22) Filed: Dec. 10, 2001

Related U.S. Application Data

(63) Continuation of application No. 09/280,920, filed on Mar. 29, 1999, now Pat. No. 6,330,606, which is a division of application No. 08/827,643, filed on Apr. 9, 1997, now Pat. No. 5,935,207, which is a continuation-in-part of application No. 08/656,924, filed on Jun. 3, 1996, now Pat. No. 5,918,013.

(51) Int. Cl.[7] .............................................. G06F 15/173
(52) U.S. Cl. ...................... 709/226; 709/213; 709/238
(58) Field of Search ............................... 709/203, 213, 709/214, 215, 217, 218, 219, 220, 221, 226, 238

(56) References Cited

U.S. PATENT DOCUMENTS

| | | | |
|---|---|---|---|
| 4,575,579 A | 3/1986 | Simon et al. ................... 178/4 |
| 4,852,151 A | 7/1989 | Dittakavi et al. ............. 379/97 |
| 4,922,523 A | 5/1990 | Hashimoto ................... 379/96 |
| 4,975,944 A | 12/1990 | Cho ............................ 379/209 |
| 4,995,074 A | 2/1991 | Goldman et al. ............. 379/97 |
| 5,005,011 A | 4/1991 | Perlman et al. ............. 340/728 |
| 5,095,494 A | 3/1992 | Takahashi et al. ............ 375/10 |
| 5,220,420 A | 6/1993 | Hoarty et al. .................. 358/86 |
| 5,241,587 A | 8/1993 | Horton et al. ................. 379/92 |
| 5,263,084 A | 11/1993 | Chaput et al. ............... 379/215 |
| 5,287,401 A | 2/1994 | Lin .............................. 379/98 |
| 5,299,307 A | 3/1994 | Young ......................... 395/161 |
| 5,325,423 A | 6/1994 | Lewis .......................... 379/90 |
| 5,329,619 A | 7/1994 | Pagé et al. ................... 395/200 |
| 5,341,293 A | 8/1994 | Vertelney et al. ...... 364/419.17 |
| 5,369,688 A | 11/1994 | Tsukamoto et al. ......... 379/100 |

(List continued on next page.)

OTHER PUBLICATIONS

Bestavros, Azer et al., "Appication–Level Document Caching in the Internet," IEEE, Jun. 1995, pp. 166–173.

(List continued on next page.)

*Primary Examiner*—Patrice Winder
(74) *Attorney, Agent, or Firm*—Workman, Nydegger

(57) ABSTRACT

A method and apparatus for dispatching document requests in a proxy to more efficiently allocate the document cache space within the proxy is provided. A proxy includes a document cache storing recently requested documents. The proxy is coupled to a client and to a remote server. A Uniform Resource Locator ("URL") is included in the document request. The proxy forwards the request to one of a plurality of proxy servers based upon the URL. According to another aspect of the present invention, the proxy performs a hash function on the URL that maps the URL to exactly one of the plurality of proxy servers. Advantageously, in this manner, mutually exclusive portions of the Web's content can be allocated to particular proxy servers.

30 Claims, 10 Drawing Sheets

U.S. PATENT DOCUMENTS

| | | | | |
|---|---|---|---|---|
| 5,410,541 A | 4/1995 | Hotto | ............................ | 370/76 |
| 5,425,092 A | 6/1995 | Quirk | .......................... | 379/215 |
| 5,469,540 A | 11/1995 | Powers, III et al. | ......... | 395/158 |
| 5,488,411 A | 1/1996 | Lewis | ............................ | 348/8 |
| 5,490,208 A | 2/1996 | Remillard | ..................... | 379/96 |
| 5,530,852 A | 6/1996 | Meske, Jr. et al. | ........... | 395/600 |
| 5,538,255 A | 7/1996 | Barker | .......................... | 463/41 |
| 5,558,339 A | 9/1996 | Perlman | ....................... | 463/42 |
| 5,561,709 A | 10/1996 | Remillard | ..................... | 379/96 |
| 5,564,001 A | 10/1996 | Lewis | .......................... | 395/154 |
| 5,572,643 A | 11/1996 | Judson | ........................ | 395/793 |
| 5,586,257 A | 12/1996 | Perlman | ....................... | 463/42 |
| 5,586,260 A | 12/1996 | Hu | .......................... | 395/187.01 |
| 5,612,730 A | 3/1997 | Lewis | ............................ | 348/8 |
| 5,623,600 A | 4/1997 | Ji et al. | .................. | 395/187.01 |
| 5,654,886 A | 8/1997 | Zereski, Jr. et al. | ......... | 364/420 |
| 5,657,390 A | 8/1997 | Elgamal et al. | ................ | 380/49 |
| 5,657,450 A | 8/1997 | Rao et al. | ..................... | 395/610 |
| 5,675,510 A | 10/1997 | Coffey et al. | ............ | 364/514 A |
| 5,678,041 A | 10/1997 | Baker et al. | ................. | 395/609 |
| 5,708,780 A | 1/1998 | Levergood et al. | ..... | 395/200.59 |
| 5,712,979 A | 1/1998 | Graber et al. | ........... | 395/200.11 |
| 5,737,619 A | 4/1998 | Judson | ......................... | 395/761 |
| 5,751,956 A | 5/1998 | Kirsch | .................... | 395/200.33 |
| 5,754,774 A | 5/1998 | Bittinger et al. | ......... | 395/200.33 |
| 5,774,670 A | 6/1998 | Montulli | ................. | 395/200.57 |
| 5,787,470 A | 7/1998 | DeSimone et al. | .......... | 711/124 |
| 5,802,292 A | 9/1998 | Mogul | .................... | 395/200.33 |
| 5,802,367 A | 9/1998 | Held et al. | ................... | 709/332 |
| 5,864,852 A | 1/1999 | Luotonen | ....................... | 707/10 |
| 5,864,854 A | 1/1999 | Boyle | ........................... | 707/10 |
| 5,878,429 A | 3/1999 | Morris et al. | ................ | 707/103 |
| 5,924,116 A | 7/1999 | Aggarwal et al. | ........... | 711/122 |
| 5,933,849 A | 8/1999 | Srbljic et al. | ............... | 711/118 |
| 6,112,279 A | 8/2000 | Wang | ........................... | 711/119 |
| 6,138,141 A * | 10/2000 | DeSimone et al. | .......... | 709/213 |
| 6,272,523 B1 * | 8/2001 | Factor | ......................... | 709/203 |

OTHER PUBLICATIONS

Chankhunthod, Anawat, et al., "A Hierarchical Internet Object Cache," 1996 USEWIX Technical Conference (6 pages).

Chapman, Brent D. et al., "Building Internet Firewalls, Chapter 7: Proxy Systems," O'Reilly & Associates, Inc., Sep. 1995, pp. 189–205.

Farrow, Rik, "Securing the Web: fire walls, proxy servers, and data driven attacks," InfoWorld, Jun. 19, 1995, vol. 7, No. 25, pp. 103–104.

Frystyk, Henrik et al., "Tutorial on Server Administration," http://www.w3.org/People/Frystyk/HttpdTutorial, Oct. 1994, pp. 1–19.

Gleeson, Martin, "pwebstats: Aperl Web Statistics Generator," http://www.unimeld.edu/au/pwebstats, Oct. 1995, pp. 1–27.

Jeffrey, Clinton L. et al., "Proxy–Sharing Proxy Servers," IEEE, Mar. 1996, pp. 116–119.

Luotonene, Ari et al., "CERN httpd 3. PreRelease Notes," CERN, http://apollo.m.ehium.ac.jp/ReleaseNotes 3.Opre-html, Apr. 1994, pp. 1–3.

Luotonen, Ari, "Logging Control in CERN httpd," CERN, http://www.unikarlsruhe.de/Betrieb/www..l.aemon/User/Config/Logging.html #AccessLog, Dec. 1994, pp. 1–4.

Luotonen, Ari et al., "World–Wide Proxies," http://www.w3.org/History/1994/Proxies/Overview.html, May 24, 1994, pp. 1–20.

Mogul, Jeffrey et al., "Simple Hit–Metering and Usage–Limiting for HTTP," HTTP Working Group, Internet–Draft, Mar. 19, 1997, pp. 1–37.

Rosoff, Matt, Review: "Gateway Destination PC," c/net, inc., 2 pages, Feb. 19, 1996.

Seidman, Robert, Article: "What Larry and Lou Know (That You Don't)," c/net inc., 2 pages, Jan. 29, 1996.

Stellin, Susan, Article: "The $500 Web Box: Less in More?" c/net inc., 2 pages, 1996.

Van Name, Mark L. et al., "Proxy Servers Will Change the Web," PC Week, Ziff–Davis Publishing Co., full text, Mar. 1996.

"Caching Algorithm of CERN httpd," http://www.w3.org/History/1994/Caching/Overview.html, Oct. 1994, pp. 1–4.

Microsoft Corporation, Appendix E: Web Proxy Service Reference, http://ww.Inu.edu.cn/proxy/EE map.htm, 16 pgs.

Netscape Communications Corp., "Administrator's Guide, Netscape Proxy Server," 1995, 1996, pp. 19–20.

"Proxies," http://www.w3.org/Daemon/User/Proxies.html, Jul. 1995, pp. 1–3.

* cited by examiner

US 6,647,421 B1

METHOD AND APPARATUS FOR DISPATCHING DOCUMENT REQUESTS IN A PROXY

CROSS-REFERENCE TO RELATED APPLICATIONS

The present application is a continuation of U.S. patent application Ser. No. 09/280,920, filed on Mar. 29, 1999, entitled, "Method and Apparatus for Dispatching Document Requests in a Proxy," now U.S. Pat No. 6,330,606 B1, which is a divisional of co-pending U.S. patent application entitled "Method and Apparatus for Providing Remote Site Administrators with User Hits on Mirrored Web Sites," having application Ser. No. 08/827,643, and filed on Apr. 9, 1997, now U.S. Pat. No. 5,935,207, which is a continuation-in-part of U.S. patent application entitled, "Method and Apparatus for Providing Proxying and Transcoding of Documents in a Distributed Network," having application Ser. No. 08/656,924, and filed on Jun. 3, 1996 now U.S. Pat. No. 5,918,013. The foregoing patents and patent applications are incorporated herein by reference.

BACKGROUND OF THE INVENTION

1. The Field of the Invention

The present invention relates generally to the field of client-server computer networking. More specifically, the invention relates to a method and apparatus for dispatching document requests in a proxy.

2. The Prior State of the Art

World Wide Web (Web) documents are commonly written in Hypertext Mark-up Language (HTML). HTML documents typically reside on Web servers and are requested by Web clients. Often, delays can be introduced during Web browsing, for example, by heavy communications traffic on the Internet or by a slow response of a remote site. Providing one or more servers for mirroring Web sites located on remote servers is one means of reducing delays involved with browsing the Web. These mirroring servers, typically referred to collectively as a "proxy" or individually as "proxy servers," store frequently accessed Web sites in a local cache, thereby eliminating recurrent retrievals of commonly accessed documents. Thus, when a request for a particular Web page is received from a client, the proxy server associated with the particular client looks first to its local cache to service the request rather than the remote site upon which the Web page resides. If the requested document is found locally, the request can be serviced by the proxy server and a subsequent request to the remote server for the document can be avoided. Therefore, only when a valid copy of the requested document is not in the proxy's local cache would the remote server need to be accessed. In this manner, exposure to heavy communications traffic on the Internet and slow responses of remote serves can be reduced.

While this mirroring approach is beneficial to end-users, the proxy's cache space is inefficiently allocated in current mirroring technology. Currently, each client is assigned to one or more proxy servers. Therefore, the documents most recently requested by each active client will reside in the corresponding proxy server's cache. Assuming one or more clients assigned to different proxy servers have requested the same document recently, the same document might be cached in several of the proxy servers, thereby reducing the cache storage space for other frequently requested documents. Further, one or more extremely popular documents might potentially be cached in each proxy server. While redundancy of information is useful for fault tolerance, organized redundancy would be preferable. Given the foregoing, what is needed is a means of more efficiently allocating cache space within a proxy. Specifically, it would be desirable to allocate mutually exclusive portions of the Web's content to particular proxy servers.

SUMMARY AND OBJECTS OF THE INVENTION

A method is described for dispatching document requests in a proxy to more efficiently allocate the document cache space within the proxy. A proxy includes a document cache storing recently requested documents. The proxy is coupled to a client and to a remote server. The proxy implements a dispatching scheme for client requests that results in a more efficient allocation of the proxy's document cache space. The proxy receives a document request from a client. A Uniform Resource Locator (URL) is included in the document request. The proxy forwards the request to one of a plurality of proxy servers based upon the URL.

According to another aspect of the present invention, the proxy performs a hash function on the URL that maps the URL to exactly one of the plurality of proxy servers. Advantageously, in this manner, mutually exclusive portions of the Web's content can be allocated to particular proxy servers.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

A method and apparatus are described for maintaining a more efficient document caching scheme in a client-server computer network. In the following description, for purposes of explanation, numerous specific details are set forth in order to provide a thorough understanding of the present invention. It will be evident, however, to one skilled in the art that the present invention may be practiced without these specific details. Further, in other instances, well-known structures and devices are shown in block diagram.

The present invention includes various steps, which will be described below. The steps can be embodied in machine-executable instructions, which can be used to cause a general-purpose or special-purpose processor programmed with the instructions to perform the steps. Alternatively, the steps of the present invention might be performed by specific hardware components that contain hardwired logic for performing the steps, or by any combination of programmed computer components and custom hardware components.

While embodiments of the present invention will be described with respect to HTML documents, the method and apparatus described herein are equally applicable to other types of documents such as text files, images (e.g., JPEG and GIF), audio files (e.g., .WAV, AU, and AIFF), video files (e.g., .MOV, and AVI), and other document types commonly found on the Web.

SYSTEM OVERVIEW

The present invention may be included in a system, known as WebTV™, for providing a user with access to the Internet. A user of a WebTV™ client generally accesses a WebTV™ server via a direct-dial telephone (POTS, for "plain old telephone service"), ISDN (Integrated Services Digital Network), or other similar connection, in order to browse the Web, send and receive electronic mail (e-mail), and use various other WebTV™ network services. The WebTV™ network services are provided by WebTV™ servers using software residing within the WebTV™ servers in conjunction with software residing within a WebTV™ client.

Figure 1:
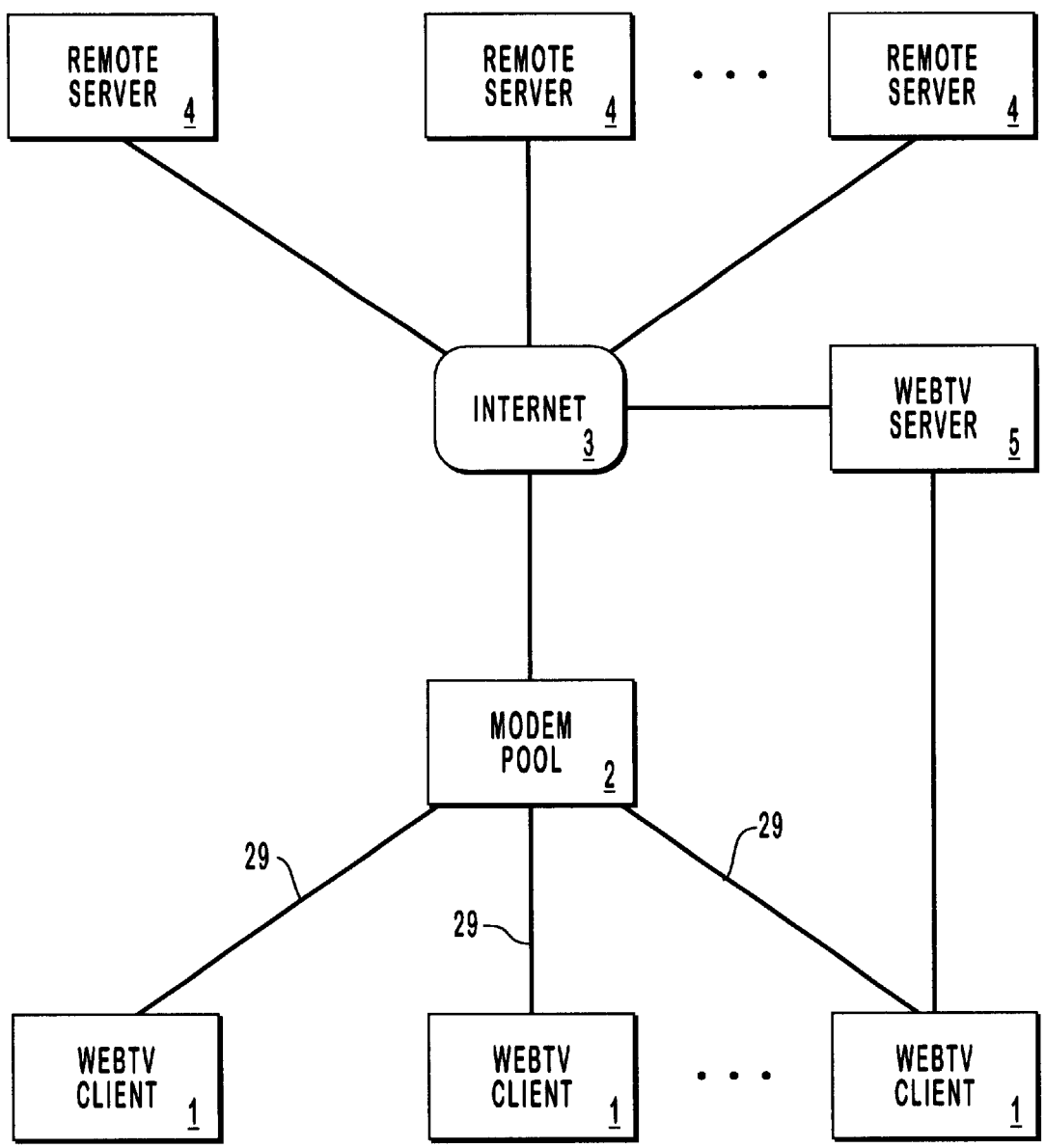
FIG. 1 is a block diagram illustrating several clients connected to a proxy server in a network.

FIG. 1 illustrates a basic configuration of the WebTV™ network according to one embodiment. A number of WebTV™ clients 1 are coupled to a modem pool 2 via direct-dial, bi-directional data connections 29, which may be telephone (POTS, i.e., "plain old telephone service"), ISDN (Integrated Services Digital Network), or any other similar type of connection. The modem pool 2 is coupled typically through a router, such as that conventionally known in the art, to a number of remote servers 4 via a conventional network infrastructure 3, such as the Internet. The WebTV™ system also includes a WebTV™ server 5, which specifically supports the WebTV™ clients 1. The WebTV™ clients 1 each have a connection to the WebTV™ server 5 either directly or through the modem pool 2 and the Internet 3. Note that the modem pool 2 is a conventional modem pool, such as those found today throughout the world providing access to the Internet and private networks. Note that in this description, in order to facilitate explanation, the WebTV™ server 5 is generally discussed as if it were a single device, and functions provided by the WebTV™ services are generally discussed as being performed by such single device. However, the WebTV™ server 5 may actually comprise multiple physical and logical devices connected in a distributed architecture, and the various functions discussed below which are provided by the WebTV™ services may actually be distributed among multiple WebTV™ server devices.

AN EXEMPLARY CLIENT SYSTEM

Figure 2:
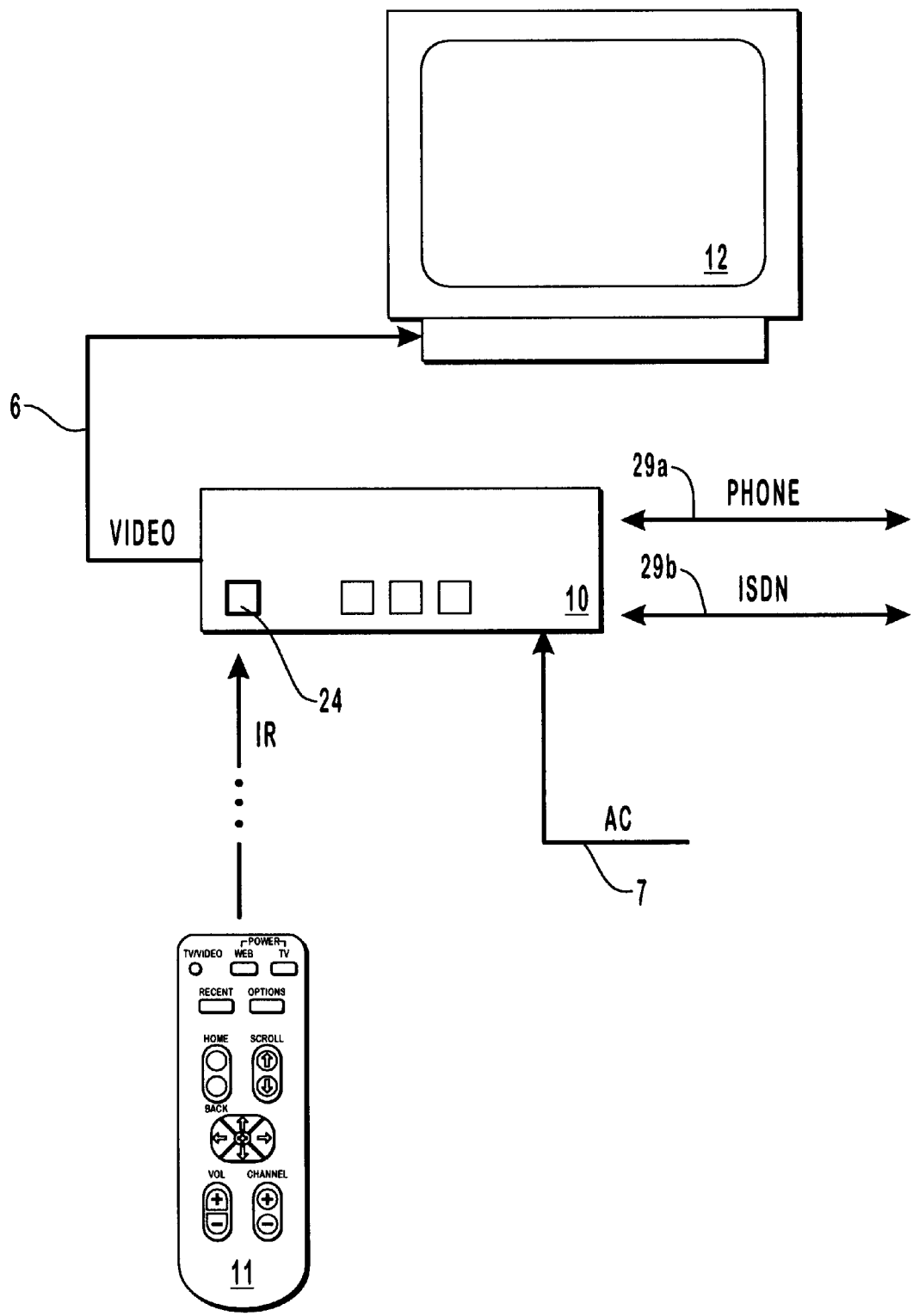
FIG. 2 is a diagram illustrating a client according to one embodiment of the present invention.

FIG. 2 illustrates a WebTV™ client 1. The WebTV™ client 1 includes an electronics unit 10 (hereinafter referred to as "the WebTV™ box 10"), an ordinary television set 12, and a remote control 11. In an alternative embodiment of the present invention, the WebTV™ box 10 is built into the television set 12 as an integral unit. The WebTV™ box 10 includes hardware and software for providing the user with a graphical user interface, by which the user can access the WebTV™ network services, browse the Web, send e-mail, and otherwise access the Internet.

The WebTV™ client 1 uses the television set 12 as a display device. The WebTV™ box 10 is coupled to the television set 12 by a video link 6. The video link 6 is an RF (radio frequency), S-video, composite video, or other equivalent form of video link. In the preferred embodiment, the client 1 includes both a standard modem and an ISDN modem, such that the communication link 29 between the WebTV™ box 10 and the server 5 can be either a telephone (POTS) connection 29a or an ISDN connection 29b. The WebTV™ box 10 receives power through a power line 7.

Remote control 11 is operated by the user in order to control the WebTV™ client 1 in browsing the Web, sending e-mail, and performing other Internet-related functions. The WebTV™ box 10 receives commands from remote control 11 via an infrared (IR) communication link. In alternative embodiments, the link between the remote control 11 and the WebTV™ box 10 may be RF or any equivalent mode of transmission.

AN EXEMPLARY SERVER SYSTEM

Figure 3:
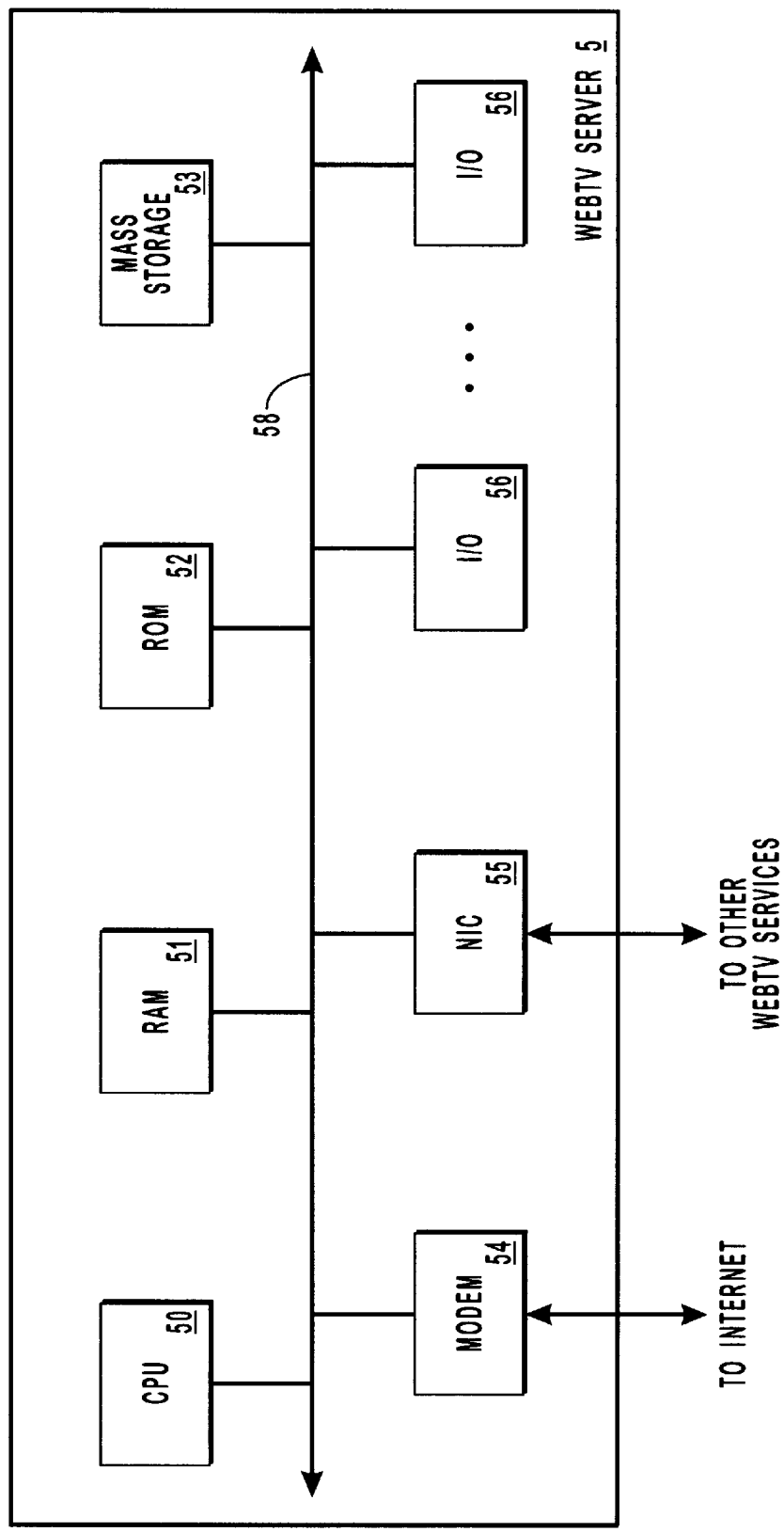
FIG. 3 is a block diagram of a server according to one embodiment of the present invention.

The WebTV™ server 5 generally includes one or more computer systems generally having the architecture illustrated in FIG. 3. It should be noted that the illustrated architecture is only exemplary; the present invention is not constrained to this particular architecture. The illustrated architecture includes a central processing unit (CPU) 50, random access memory (RAM) 51, read-only memory (ROM) 52, a mass storage device 53, a modem 54, a network interface card (NIC) 55, and various other input/output (I/O) devices 56. Mass storage device 53 includes a magnetic, optical, or other equivalent storage medium. I/O devices 56 may include any or all of devices such as a display monitor, keyboard, cursor control device, etc. Modem 54 is used to communicate data to and from remote servers 4 via the Internet.

As noted above, the WebTV™ server 5 may actually comprise multiple physical and logical devices connected in a distributed architecture. Accordingly, NIC 55 is used to provide data communication with other devices that are part of the WebTV™ services. Modem 54 may also be used to communicate with other devices that are part of the WebTV™ services and which are not located in close geographic proximity to the illustrated device.

AN EXEMPLARY PROXY

Figure 4:
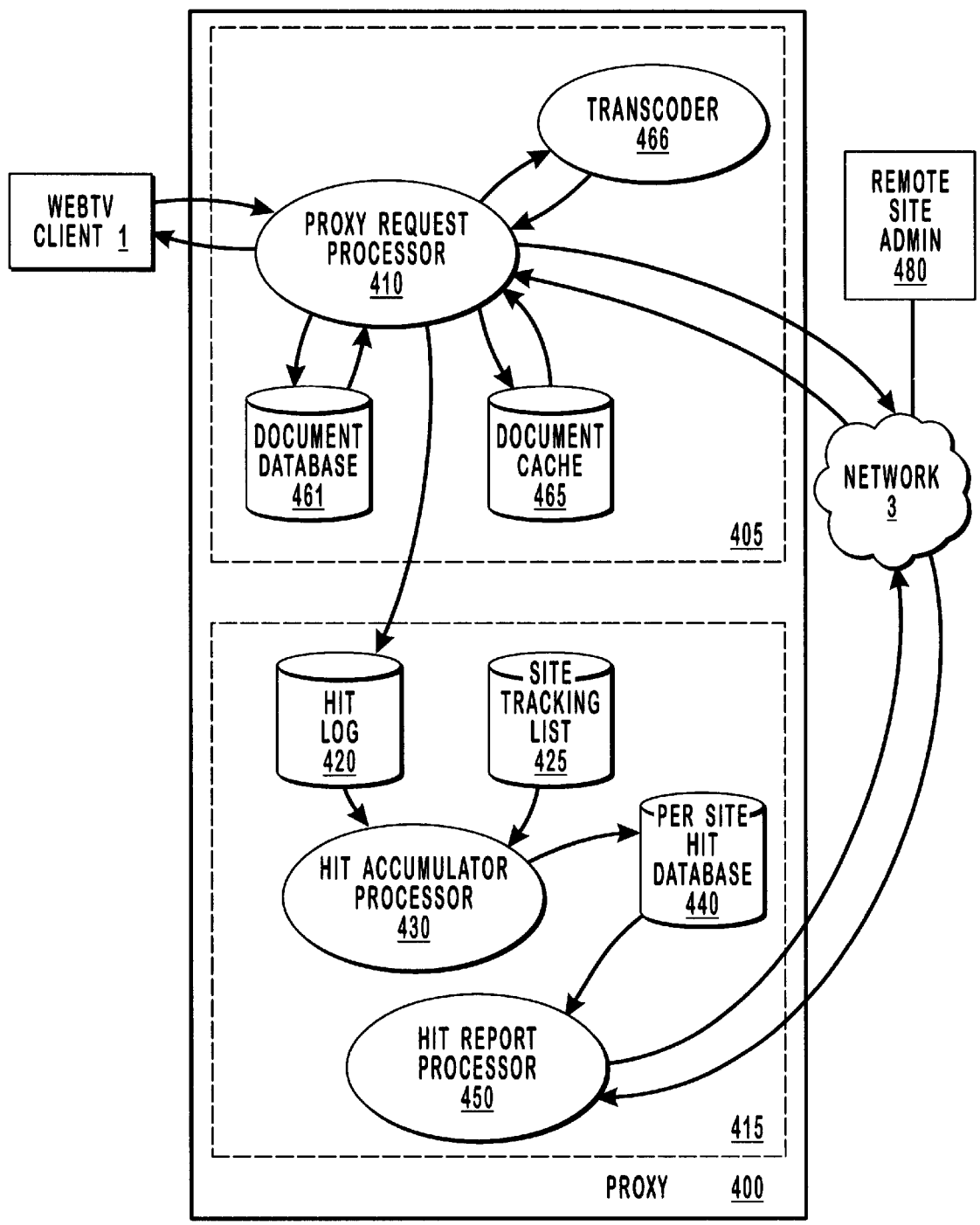
FIG. 4 is a data flow diagram illustrating the interaction of proxy components according to one embodiment of the present invention.

FIG. 4 illustrates the caching and hit accumulation features of the WebTV™ proxy 400 according to one embodiment of the present invention. In this embodiment, one or more WebTV™ servers 5 may act as a proxy 400 in providing the WebTV™ client 1 with access to the Web and other WebTV™ services. More specifically, WebTV™ server 5 functions as a "caching proxy." In this example, proxy 400 includes a proxy server 405 and a hit accumulator server 415. Client requests that are serviced from the proxy server's local document cache 465 are communicated to the hit accumulator server 415. As will be described below, the hit accumulator server 415 maintains and organizes the data so as to provide hit tracking information to remote site administrators such as remote site administrator 480. Remote site administrator 480 may include entities such as persons authorized to gather statistical data for the remote site, persons authorized to manage and maintain the remote site, the remote site itself, or an automated computer system or other device configured to receive statistical data for the remote site.

In this embodiment, the proxy server 405 includes a proxy request processor 410, a document cache 465, a document database 461, and a transcoder 466. The proxy request processor 410 receives requests from the WebTV™ client 1 and sends responses to the WebTV™ client 1. The proxy request processor 410 maintains the document database 461, the document cache 465, and further determines when transcoding will be performed. The document cache 465 is used for temporary storage of Web documents such as images, text files; audio files, video files and other information which is used frequently by either WebTV™ client 1 or the proxy server 405.

When a document request is received from a client, the proxy request processor 410 determines whether to service the request from the document cache 465 by performing a search of the document cache 465. If the document is found locally, then the document may be retrieved from the document cache 465 and transferred to the client with the response. However, if the requested document is not found, then the proxy request processor 410 requests the document from the appropriate site and upon receipt the proxy request processor 410 provides the document to the client with the response. Further, the proxy request processor 410 anticipates subsequent requests by storing the document in the document cache 465.

When a document is retrieved by the proxy server 405 from a remote server 4, for example, detailed information on this document may be stored in the document database 461. The stored information may subsequently be used by the proxy server 405 to speed up processing and downloading of that document in response to future requests for that document. In addition, the transcoding functions and various other functions of the WebTV™ service may be facilitated by making use of information stored in the document database 461. For example, the document database 461 may include certain historical and diagnostic information for Web pages that have been accessed by a WebTV™ client 1.

Document transcoder 466 is used to automatically revise the code of Web documents retrieved from the remote servers 4, for purposes such as: (1) correcting bugs in documents; (2) correcting undesirable effects which occur when a document is displayed by the client 1; (3) improving the efficiency of transmission of documents from the server 5 to the client 1; (4) matching hardware decompression technology within the client 1; (5) resizing images to fit on the television set 12; (6) converting documents into other formats to provide compatibility; (7) reducing latency experienced by a client 1 when displaying a Web page with in-line images (images displayed in text); and (8) altering documents to fit into smaller memory spaces.

In one embodiment, hit accumulator server 415 may act as a Web server providing a Hypertext Transport Protocol (HTTP) interface by which remote site administrators can access the accumulated hits for their sites by way of a Web browser. The hit accumulator server 415 may include a hit log 420, a hit accumulator processor 430, a site tracking list 425, a hit report processor 450, and a per site hit database 440. One method of communicating hits from a given proxy server to the hit accumulator server 415 is through a common storage device such as hit log 420. This and other methods of communicating hits will be described below. Regardless of how hits are communicated to the hit accumulator server 415, a processor such as the hit accumulator processor 430 is desirable to verify the hits against a list of locations that are to be monitored. Such a list of locations may be stored in the site tracking list 425, for example. A location, in this context, refers to the location of a document. The location may be represented by a URL, a directory path, or other mechanisms for uniquely identifying a particular document. Hits that are validated by the hit accumulator processor 430 are recorded in the per site hit database 440. Thus, the per site hit database 440 will have a current count of the hits for each location listed in the site tracking list 425. In this embodiment, the hit report processor 450 may receive requests from remote site administrators such as remote site administrator 480 for hit reports. The hit reports can be extracted from the per site hit database 440 and transmitted to the requester in an HTML report, for example.

While in this embodiment the proxy server 405 and the hit accumulation server 415 have been shown as separate servers, the functionality of both could be combined into one WebTV™ server 5. Additionally, the proxy 400 might be expanded to include more than one proxy server 405. When expanding the proxy 400 to include more than one proxy server 405, only one hit accumulation server 415 need be employed.

In alternative embodiments, hits may be communicated by a proxy server 405 to the accumulation server 415 by way of a network connection such as permanent connection through which events may be sent. Also, message passing may be employed whereby the proxy server 405 sends a message such as a datagram to the hit accumulator 415 to notify it of a document cache hit. It is appreciated that many other means of communicating information between servers are possible.

Figure 5B:
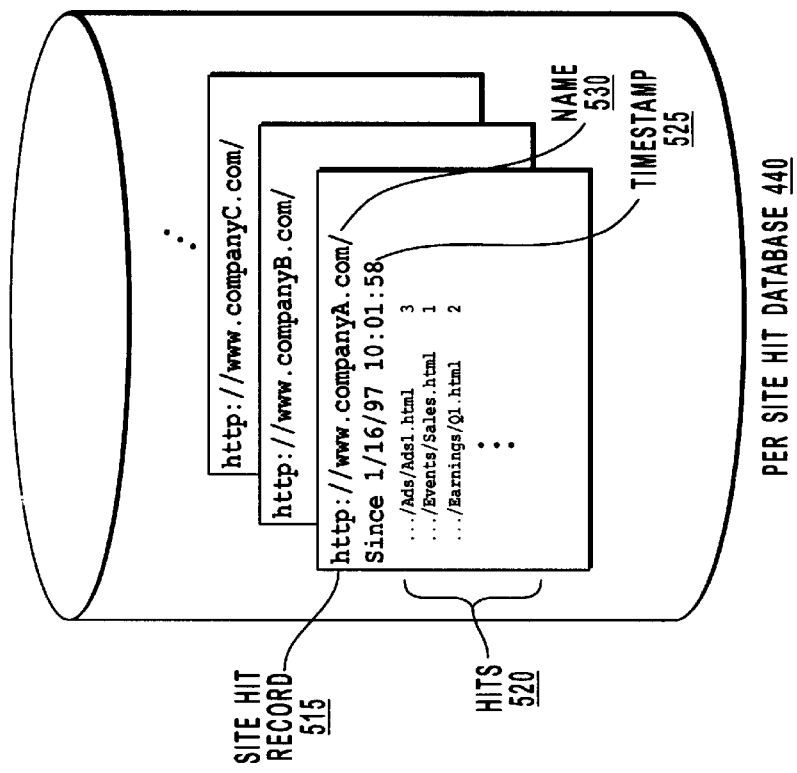
FIG. 5B is a depiction of an exemplary per site hit database according to one embodiment of the present invention.
Figure 5A:
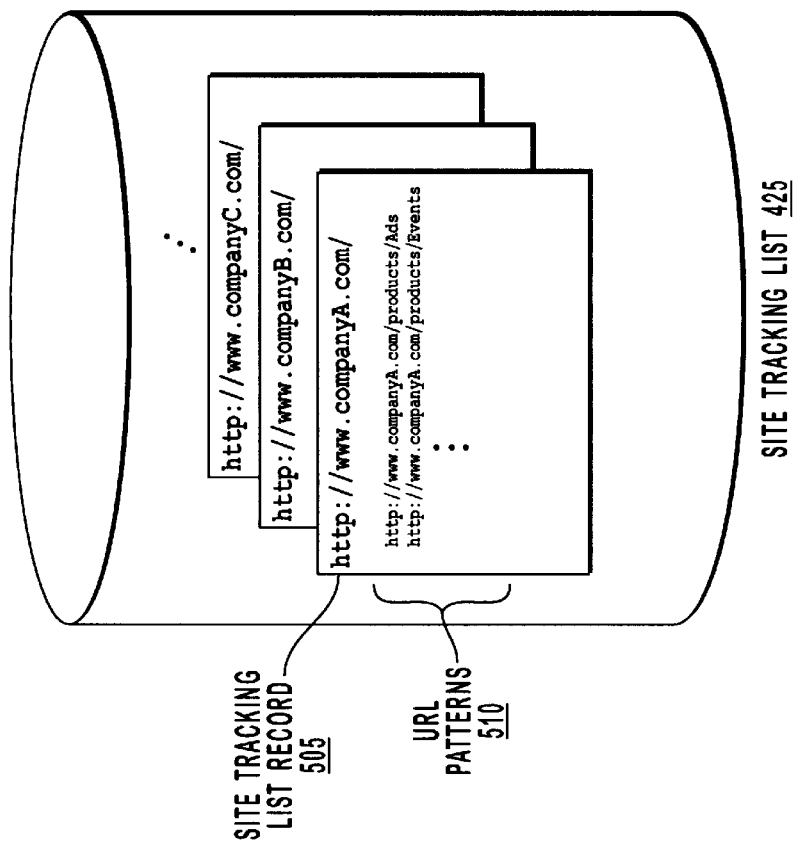
FIG. 5A is a depiction of an exemplary site tracking list according to one embodiment of the present invention.

FIG. 5A illustrates an exemplary site tracking list according to one embodiment of the present invention. This illustration depicts a site tracking list 435 including site tracking list records 505 for three remote sites: (1) addressed to companyA.com/; (2) addressed to companyB.com/; and (3) addressed to companyC.com/. In this embodiment, each site tracking list record 505 may include a list of one or more URL patterns 510.

The list of URL patterns 510 may be a list of strings identifying the initial portions (e.g., prefixes) of URLs to be tracked. In this example, the proxy 400 tracks hits for documents identified by URLs with a prefix that matches any of the URL patterns 510 specified in one of the site tracking list records 505. The hits may then be logged to a record in the per site hit database 440 corresponding to the site tracking list record 505 which contained the matching URL pattern. This form of URL pattern is useful for tracking hits for a particular grouping of Web pages beginning with the same initial sequences of characters. For example, the URLs for the Web pages of Company A might all begin with "http:H/www" and be addressed to "companyA.com/." Additionally, the Web pages associated with products produced by Company A might all begin with the sequence "http://-www" and be addressed to "companyA.com/product/." Furthermore, pages related to a particular product might all begin with the URL prefix "http://www" and be addressed to "companyA.com/product/<product_name>/" where <product_name>identifies the particular product. To track the hits for pages relating to Company A's Gizmo product line, therefore, the following URL pattern may be used: "http://www", followed by "companyA.com/product/

Gizmo/." Similarly, to track the hits for all of Company A's products the following URL pattern may be used: "http://www", followed by "companyA.com/product/."

URL patterns are not limited to prefixes, other forms of URL patterns may be used such as patterns including wild card or other special characters, or patterns in the form of standard regular expressions.

AN EXEMPLARY PER SITE HIT DATABASE

FIG. 5B illustrates an exemplary per site hit database according to one embodiment of the present invention. Based upon the information provided in the site tracking list 425 of FIG. 5A, an exemplary per site hit database might be represented as per site hit database 440. In this example, the per site hit database 440 includes three site hit records 515 corresponding to remote sites for CompanyA, CompanyB and CompanyC.

In this embodiment, each site hit record 515 includes a timestamp 525. The timestamp 525 may indicate the time from which the hits have been accumulated. In this example, therefore, there have been six hits to the monitored URLs since Jan. 16, 1997 at 10:01:58. Those of skill in the art will appreciate the timestamp 525 may represent the period of accumulation in other ways such as elapsed time since the last hit report was generated.

Site hit records 515 also include a remote site name 530. The remote site names 530 from front to back correspond to CompanyA, CompanyB, and CompanyC. Site hit record 515 further includes a list of hits 520. In this embodiment, the list of hits 520 includes the URLs of the documents that were requested and subsequently serviced from the proxy's local cache (e.g., document cache 465) since the time indicated by the timestamp 525. According to the site hit record 515 for CompanyA, the ad1.html Web page has been requested and serviced from the proxy's local cache three times. Similarly, the sales.html and Q1.html Web pages have been provided from the proxy's cache once and twice, respectively. Based upon the accumulated hit information in a particular site hit record 515, a detailed hit report may be provided to the corresponding remote site administrator. Hit accumulation will be discussed further below.

Figure 6:
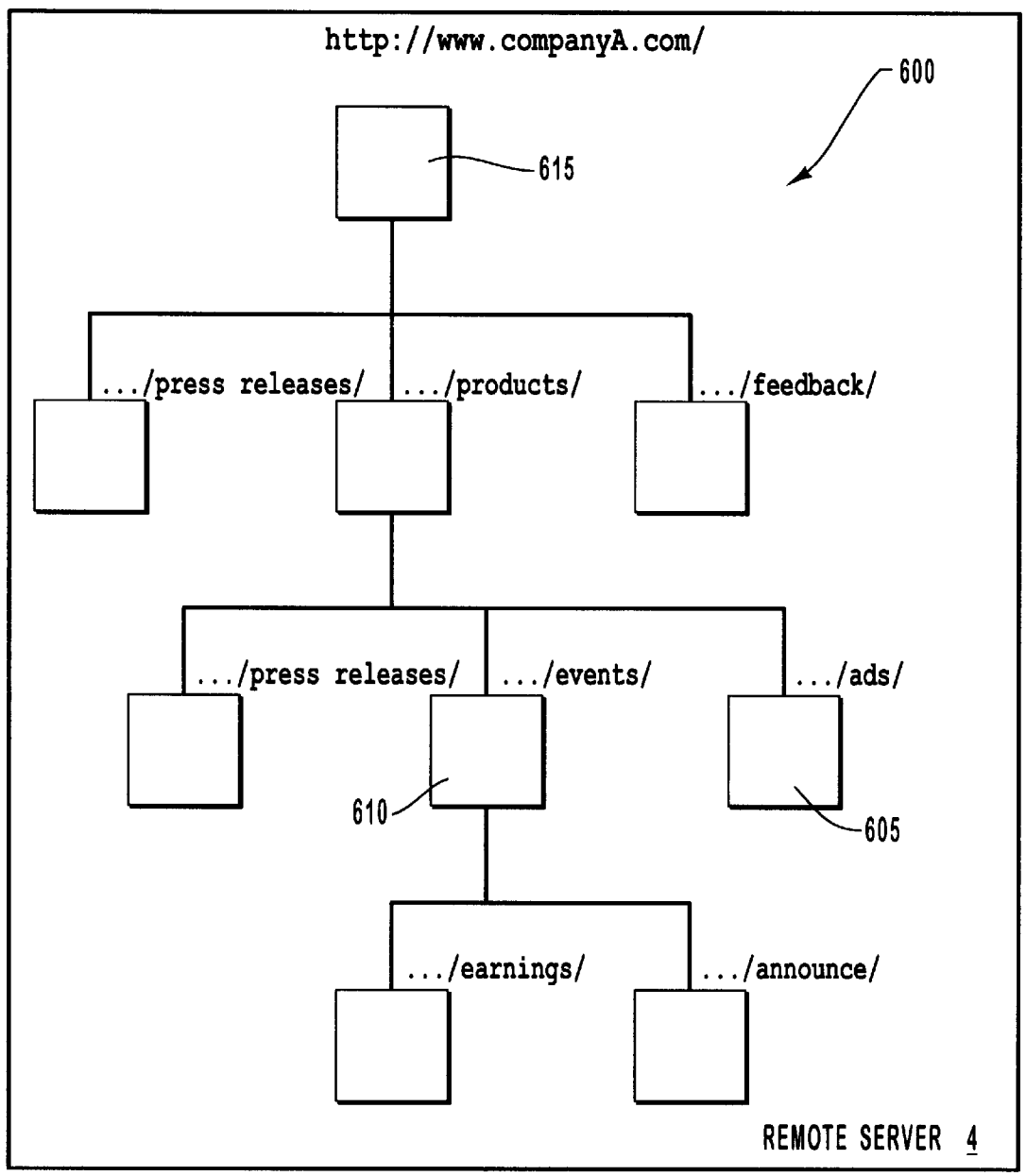
FIG. 6 is a logical view of an exemplary directory structure of a remote server.

FIG. 6 is a logical view of an exemplary directory structure 600 that may exist on a remote server 4. This exemplary directory structure 600 illustrates the need for a flexible method of tracking the number of hits. Web pages might reside in any or all of the directories shown. In this example, the URL patterns within a site tracking list record 505 may identify a particular directory or directories in the hierarchy depicted.

The remote site administrator for CompanyA may want to know the number of hits in an Ads subdirectory 605 and an Events subdirectory 610. This may be due to the fact that advertising banners are shown on Web pages in these directories and the advertisers may want feedback on how many Web viewers are seeing their ads. Alternatively, the company may have its own business reasons for analyzing statistics in certain areas of their Web site. Regardless, it is apparent that simply tracking all hits for a root directory 615 on the company's server is insufficient. For example, hits would be tracked for directories in which the remote site administrator had no interest. A list of URL patterns is used to accommodate the flexibility desired. For example, URL patterns may be stored in the site tracking list 425 for CompanyA to track the above-mentioned subdirectories that are addressed to: "companyA.com/products/Events/" and "companyA.com/products/Ads/." The list of URL patterns 510 in each site tracking list record 505 allows a remote site to enumerate specific directories, for example, in which they would like to track user hits.

The advantages of providing forms of URL patterns with wild cards becomes apparent with reference to the directory structure 600. Assume the "*" character is a wild card. That is, it matches zero or more characters. Since, CompanyA has two subdirectories with press releases, a convenient way to track hits in both is with the following URL pattern addressed to: "companyA.com/*press_releasesA/." Without the use of a wild card, the equivalent URL patterns are as addressed as follows: "companyA.com/press_releases/" and "companyA.com/products/press_releases." Thus, it should be appreciated that wild cards and regular expressions provide additional efficiency and convenience in the specification of URL patterns.

HIT ACCUMULATION

Figure 7:
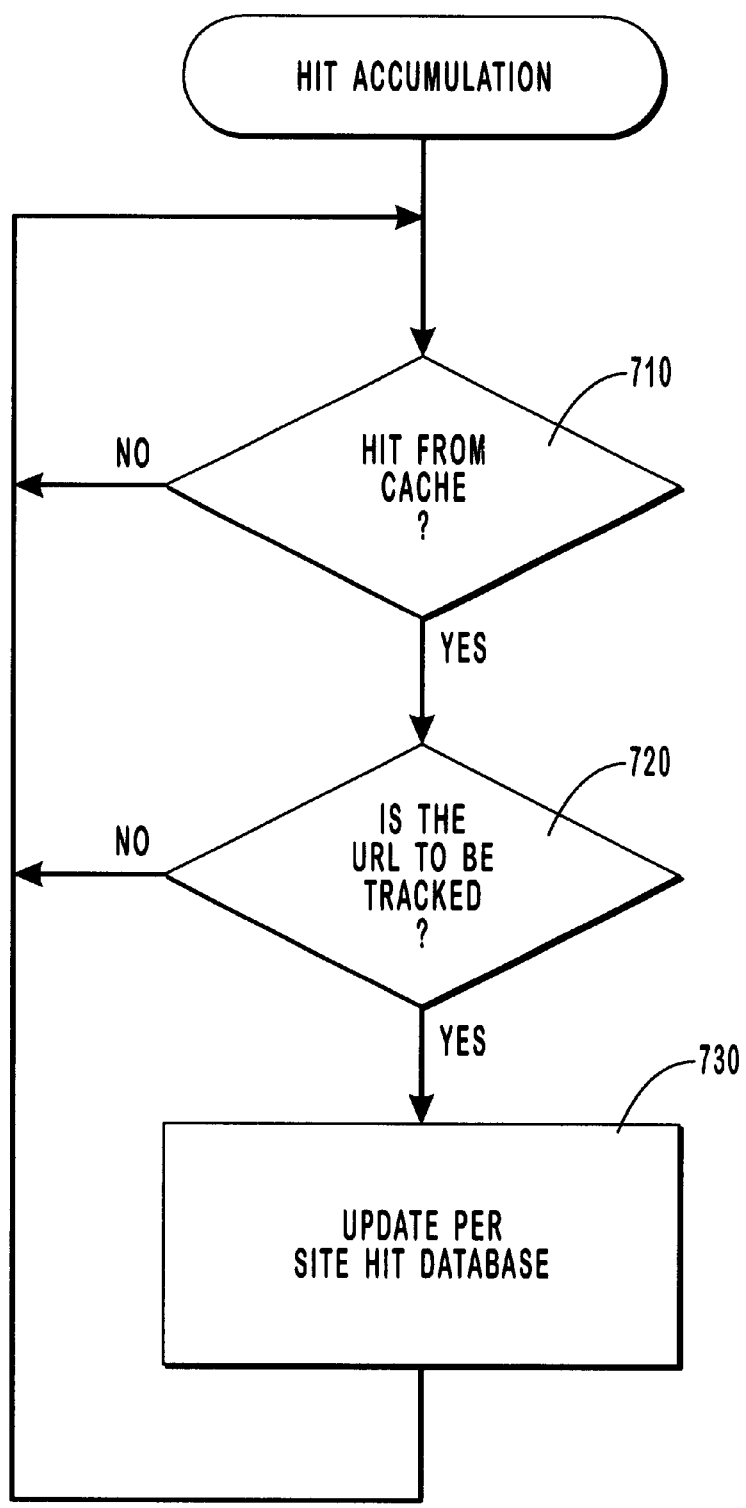
FIG. 7 is a flow diagram illustrating a method of performing hit accumulation according to one embodiment of the present invention.

FIG. 7 is a flow diagram illustrating a method of performing hit accumulation according to one embodiment of the present invention. In this embodiment, each site hit record 515 begins in an initial state having an indication of the remote site (e.g., the name 530) and a timestamp 525 representing the time at which hit accumulation began. Initially, the hit accumulation server 415 waits for an indication that a client request has been serviced from the proxy's local cache (step 710). For example, the hit accumulator processor 430 may determine that a new entry has been made to the hit log 420.

Upon receiving an indication that the proxy 400 has served up a cached response, the hit accumulation server 415 determines if the URL of the document retrieved from the proxy's local cache is one whose hits are to be tracked. As discussed above, not all hits are tracked. In this embodiment, hits are tracked only for documents matching URL patterns that have been registered in a tracking list such as the site tracking list 425, discussed above. Therefore, the hit accumulator processor 430 compares the URL of the retrieved document to URL patterns 510 in each site tracking list record 505 to determine if the hit will be recorded in the per site hit database 440 (step 720). If no URL patterns 510 match the retrieved document the hit is ignored. Otherwise, if the retrieved document matches any of the URL patterns 510, then the appropriate site hit record 515 in the per site hit database 440 is updated (step 730).

Update of the site hit record 515 can be explained briefly with respect to FIG. 5B. In this embodiment, the appropriate site hit record 515 is searched for an entry that matches the URL of the retrieved document. If the retrieved document's URL does not already exist in the list of hits 520 for the site hit record 515, then the URL is added and its count is set to one since this is the document's first hit. However, if the retrieved document's URL was already in the list of hits 520 (meaning it has had at least one previous hit), then only the corresponding count needs to be incremented. In this manner, each document retrieved from the proxy's local cache that matches a tracked URL pattern will have an entry in the list of hits 520 with a corresponding count indicating the number of cache hits.

HIT REPORTING

Figure 8:
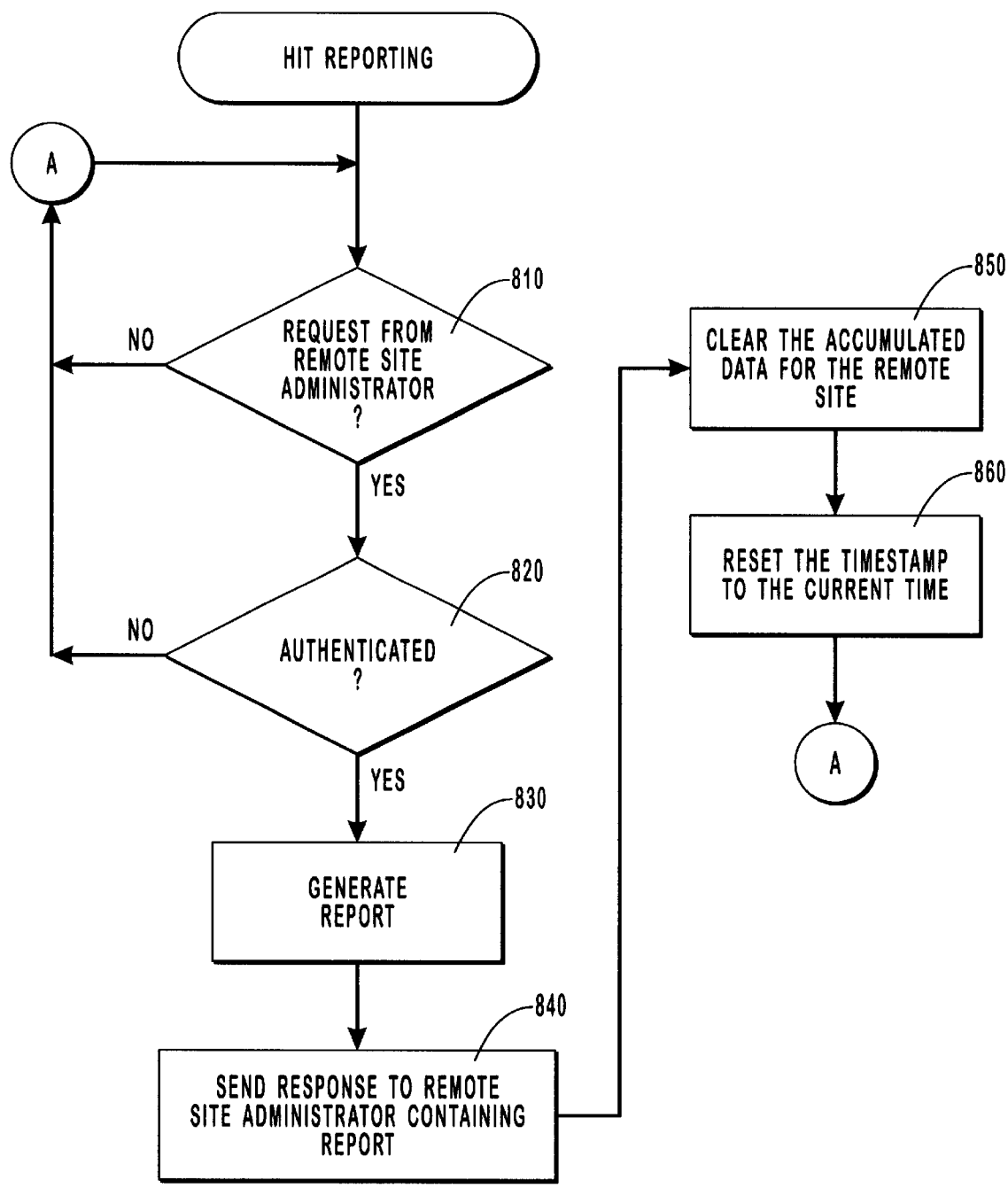
FIG. 8 is a flow diagram illustrating a method of hit reporting according to one embodiment of the present invention.

Referring now to FIG. 8, a method of hit reporting according to one embodiment of the present invention is illustrated. In this embodiment of the present invention, the hit accumulator server 415, in addition to its other responsibilities, acts as a Web server providing an HTTP interface by which remote site administrators can access the accumulated hits for their respective tracked sites. The hit report processor 450 waits until a request is received from a remote site administrator (step 810). Preferably, the HTTP address on the hit accumulation server 415 can be used to identify the requester of the information. For example, the hit report for Company A, might be accessed on the hit accumulation server 415 at the following web address: "webtv.net/hits/company_a."

To limit access to the hit reports a secure communication technology such as Secure Sockets Layer (SSL) or other available secure communication protocol can be used to keep the hit information private by providing encrypted communications across the network. Additionally, the report requests can be authenticated to assure only a particular remote server or individual can access the information (step 820).

Once a request has been received from a remote site administrator and it has been optionally authenticated, then a report can be generated from the hit data accumulated such as the list of hits 520 for the particular site hit record 515 (step 830). In this embodiment, the report may include a list of URLs and their corresponding counts since the last report.

For convenient access via the Web, the report may be formatted in an HTML format. Also, for the convenience of the remote site administrator, a timestamp that identifies the starting point of the accumulation may be included in the report. The level of specificity of the URL list may be at the document level thereby allowing the remote site administrator to determine the number of hits for individual documents. However, it may also be helpful to additionally summarize the hits by directory, for example. It will be recognized that numerous other ways of formatting and arranging the hit reports are possible.

After the report has been formatted, the response containing the report is transmitted to the remote site administrator (step 840).

In this embodiment, before resuming the hit accumulation of FIG. 7, the accumulated data in the site hit record 515 is cleared (step 850) also the timestamp 525 is reset to reflect the current time. The above steps for retrieving a report from the proxy may be periodically repeated at the convenience of the remote site administrator whenever an accurate total hit count is desired.

In alternative embodiments, hit reports may be provided to remote sites in a number of other ways. Hit reports need not be initiated by a request from the remote site administrator. For example, the proxy may periodically send unsolicited hit reports via email, the proxy may periodically download hit updates to a device specified by the remote site administrator, or the hit reports might be transmitted to remote site administrators in the form of datagrams. In any event, the assignees of the present invention appreciate a variety of reporting mechanisms are possible.

ALLOCATION OF CACHE SPACE WITHIN A PROXY

Figure 9:
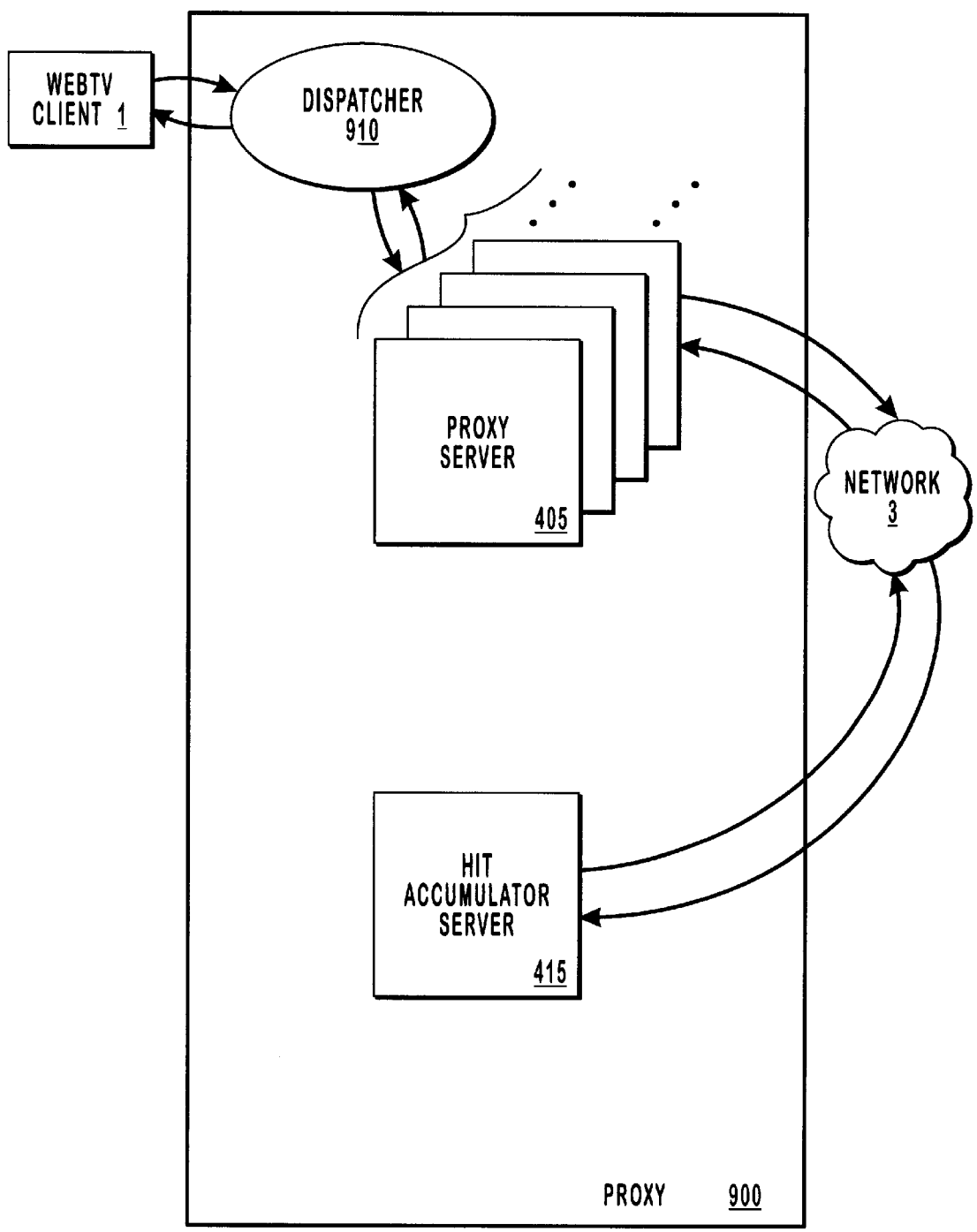
FIG. 9 is a data flow diagram illustrating the interaction of proxy components according to another embodiment of the present invention.

FIG. 9 is a data flow diagram illustrating the interaction of proxy components according to another embodiment of the present invention. In this embodiment, proxy 900 includes a plurality of proxy servers 405 communicatively coupled to a dispatcher 910 and a hit accumulator server 415. Rather than allowing a given proxy server's cached contents to be determined based upon the requests of an associated client, the content of the Web can be distributed among proxy servers 405 by a hash algorithm executed by the dispatcher 910. The hash algorithm preferably maps a given URL to one and only one of the plurality of proxy servers 405. This can be accomplished using a portion of the output of a secure hash algorithm such as the Message Digest 5 (MD5) hash algorithm. The hash algorithm can be thought of as a mechanism for assigning a range of URLs to each of the proxy servers 405 in the proxy 900.

In this embodiment, the dispatcher 910 receives document requests including URLs from a client such as WebTV™ client 1. Based upon the URL in the request, the dispatcher 910 determines the proxy server 405 in which the document should be cached and forwards the client request to that proxy server 405. If the document requested by the client is not found in the proxy server's local document cache 465, then the proxy server 405 requests the document from the appropriate server (e.g., a remote server) and caches the document when it is received from the server.

If redundancy is desired, the hashed result of a URL may be used to identify a cluster of two or more proxy servers rather than a single proxy server 405. In this manner, the load required to support a popular document can be shared among a group of proxy servers.

In an alternative embodiment, a decentralized dispatching scheme can be implemented. For example, the proxy servers 405 may be arranged to form an interconnected ring configuration and the functionality of the dispatcher 910 may be incorporated into each proxy server 405. In this embodiment, the client document requests may be initially handled by one of the proxy servers 405 in the ring. If the requested document is not found in the local cache of the initial proxy server, the initial proxy server may forward the request to the appropriate proxy server based on the hashing scheme discussed above.

Figure 10:
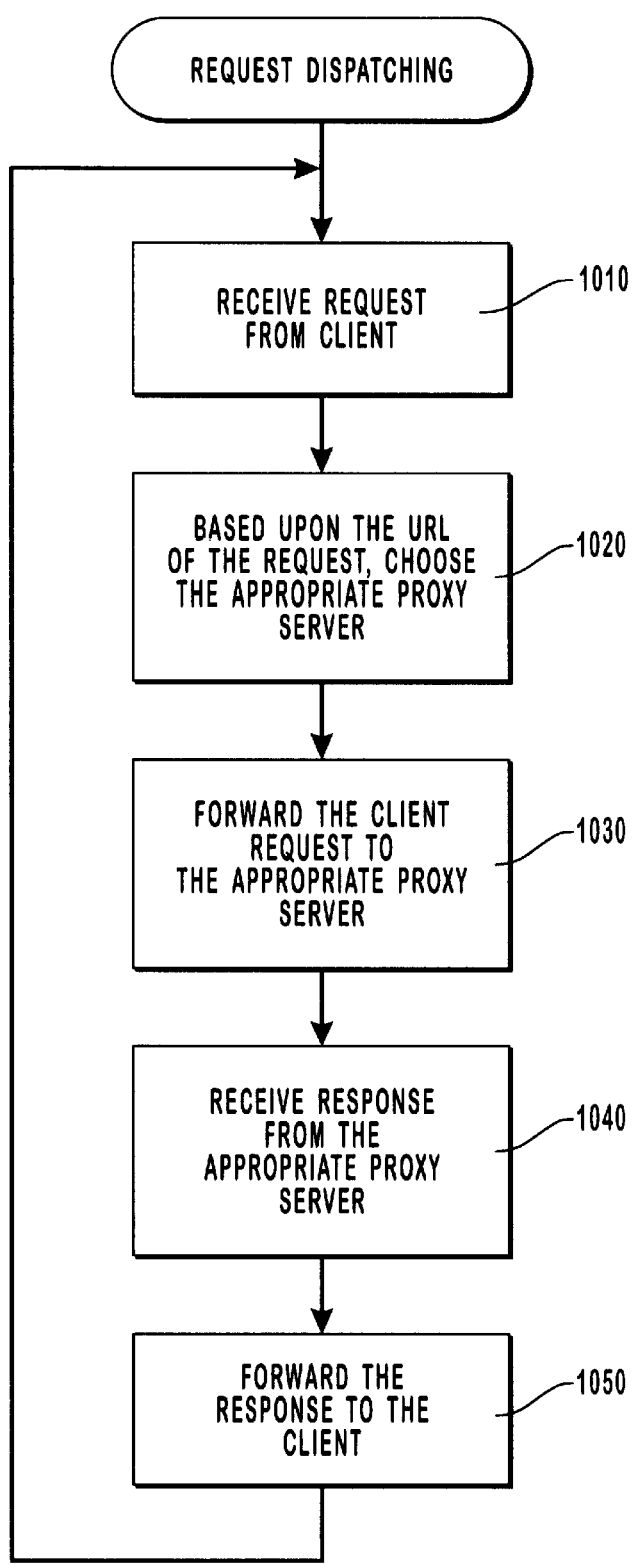
FIG. 10 is a flow diagram illustrating a method of dispatching requests to segregate the storage of documents according to one embodiment of the present invention.

FIG. 10 is a flow diagram illustrating a method of dispatching requests to segregate the storage of documents according to one embodiment of the present invention. While both a centralized and a decentralized request dispatching mechanism have been discussed above, the method described below is generally applicable to both. In this embodiment, initially, a document request is received from a client (step 1010). If a centralized dispatcher such as dispatcher 910 receives the request, then based upon the URL an appropriate proxy server is determined based upon the output of the hash algorithm (step 1020).

However, in a decentralized dispatching environment, the initial proxy server receiving the client request may assume it is the appropriate proxy server and first check its local document cache 465. If the document is not present, then proxy server may perform the hash algorithm on the URL to determine which of the remaining proxy servers is appropriate for the request (step 1020).

After determining the proxy server appropriate for the client request, the request is forwarded to that proxy server (step 1030). The proxy server 405 attempts to service the request from its local document cache 465. If a cache hit occurs, then the document is immediately available from the proxy server's local document cache 465. However, if a cache miss occurs, the proxy server 405 will retrieve the document from an appropriate server and store a copy locally. In any event, the centralized or decentralized dispatching mechanism ultimately receives a response from the server (e.g., the document requested by the client) (step 1040). Finally, the response, typically in the form of an HTML document is forwarded to the client (step 1050). This method of caching documents segregates the content of the Web based upon the URL of the documents. Since each URL will map to only one proxy server 405, advantageously this approach more efficiently allocates the proxy's cache space by avoiding unnecessary redundancy.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed and desired to be secured by United States Letters Patent is:

1. In a networked computer system that includes a plurality of remote servers, a plurality of proxy servers, and a plurality of client systems, all of which are logically interconnected so that the client systems can access informational content stored at the one or more remote servers, a method of efficiently allocating cache space within the plurality of proxy servers so that requested content is distributively cached at mutually exclusive proxy servers, comprising steps for:

dividing responsibility for obtaining and caching content among a plurality of proxy servers, wherein at least two proxy servers are responsible for obtaining and caching mutually exclusive content;

receiving a request for content that is available at one or more particular remote servers;

rather than allowing any arbitrary proxy server to obtain and cache the requested content from the one or more particular remote servers, mapping the request to a specific proxy server; and at the specific proxy server to which the request is mapped, searching for the requested content in a local cache, and if the requested content is found in the local cache, returning it to a client system from which the request was received, and if the requested content is not found, then obtaining the requested content from the one or more particular remote servers and storing it in the local cache, and returning the requested content to the client system from which the request was received.

2. A method as recited in claim 1, wherein the requested content comprises one or more Web pages, and wherein the request comprises one or more uniform resource locators for the one or more Web pages.

3. A method as recited in claim 1, wherein the step for mapping identifies a cluster of two or more proxy servers, the method further comprising a step for storing requested content that is obtained from at least one remote server in the local cache of each proxy server in the cluster.

4. A method as recited in claim 3, further comprising a step for distributing multiple requests for the requested content among the two or more proxy servers of the cluster.

5. A method as recited in claim 1, wherein the step for mapping comprises an act of applying a hash algorithm.

6. A method as recited in claim 5, wherein the hash algorithm comprises a Message Digest 5 algorithm.

7. A method as recited claim 1, wherein a central dispatcher receives the request for content and maps the request, the method further comprising a step for forwarding the request to the specific proxy server.

8. A method as recited in claim 1, wherein an initial proxy server receives the request for content, the method further comprising a step for forwarding the request to the specific proxy server after the initial proxy server searches for the requested content in a local cache and the requested content is not found.

9. In a networked computer system that includes a plurality of remote servers, a plurality of proxy servers and a plurality of client systems, all of which are logically interconnected so that the client systems can access informational content stored at the one or more remote servers, a computer program product for implementing a method of efficiently allocating cache space within the plurality of proxy servers so that requested content is distributively cached at mutually exclusive proxy servers, comprising a computer readable medium for storing executable instructions for implementing the method, wherein the method comprises steps for:

dividing responsibility for obtaining and caching content among a plurality of proxy servers, wherein at least two proxy servers are responsible for obtaining and caching mutually exclusive content;

receiving a request for content that is available at one or more particular remote servers;

rather than allowing any arbitrary proxy server to obtain and cache the requested content from the one or more particular remote servers, mapping the request to a specific proxy server; and at the specific proxy server to which the request is mapped, searching for the requested content in a local cache, and if the requested content is found in the local cache, returning it to a client system from which the request was received, and if the requested content is not found, then obtaining the requested content from the one or more particular remote servers and storing it in the local cache, and returning the requested content to the client system from which the request was received.

10. A computer program product as recited in claim 9, wherein the requested content comprises one or more Web pages, and wherein the request comprises one or more uniform resource locators for the one or more Web pages.

11. A computer program product as recited in claim 9, wherein the step for mapping identifies a cluster of two or more proxy servers, the method further comprising a step for storing requested content that is obtained from at least one remote server in the local cache of each proxy server in the cluster.

12. A computer program product as recited in claim 11, the method further comprising a step for distributing multiple requests for the requested content among the two or more proxy servers of the cluster.

13. A computer program product as recited in claim 9, wherein the step for mapping comprises an act of applying a hash algorithm.

14. A computer program product as recited in claim 13, wherein the hash algorithm comprises a Message Digest 5 algorithm.

15. A computer program product as recited claim 9, wherein a central dispatcher receives the request for content and maps the request, the method further comprising a step for forwarding the request to the specific proxy server.

16. A computer program product as recited in claim 9, wherein an initial proxy server receives the request for content, the method further comprising a step for forwarding the request to the specific proxy server after the initial proxy server searches for the requested content in a local cache and the requested content is not found.

17. In a networked computer system that includes a plurality of remote servers, a plurality of proxy servers and a plurality of client systems, all of which are logically interconnected so that the client systems can access informational content stored at the one or more remote servers, a method of efficiently allocating cache space within the plurality of proxy servers so that requested content is distributively cached at mutually exclusive proxy servers, comprising acts of:

assigning to each of a plurality of proxy servers a mutually exclusive range of content to retrieve from one or more remote servers on behalf of one or more client systems and cache;

hashing at least a portion of a request received from a client system for content that is available at one or more particular remote servers;

rather than allowing any arbitrary proxy server to retrieve and cache the requested content, identifying, with the at least a portion of the hashed request, at least one proxy server assigned to a particular mutually exclusive range of content that corresponds to the requested content; and at the at least one identified proxy server, examining a local cache for the requested content, and if found in the local cache, sending the requested content to the client system, but if not found in the local cache, retrieving the requested content from the one or more particular remote servers, storing the requested content in the local cache, and sending the requested content to the client system.

18. A method as recited in claim 17, wherein the requested content comprises one or more Web pages, and wherein the request comprises one or more uniform resource locators for the one or more Web pages.

19. A method as recited in claim 17, wherein the act of hashing identifies a cluster of two or more proxy servers collectively assigned to the particular mutually exclusive range of content that corresponds to the requested content, the method further comprising an act of adding any requested content that is received from the one or more particular remote servers to the local cache of each proxy server in the cluster.

20. A method as recited in claim 19, further comprising an act of load balancing multiple requests for the requested content among the two or more proxy servers of the cluster.

21. A method as recited in claim 17, wherein the hashing comprises a Message Digest 5 algorithm.

22. A method as recited in claim 17, wherein a central dispatcher receives the request for content and hashes the at least a portion of the request, the method further comprising an act of sending the request to the at least one identified proxy server.

23. A method as recited in claim 17, wherein an initial proxy server receives the request for content, the method further comprising an act of sending the request to the at least one identified proxy server after the initial proxy server searches for the requested content in a local cache and the requested content is not found.

24. In a networked computer system that includes a plurality of remote servers, a plurality of proxy servers and a plurality of client systems, all of which are logically interconnected so that the client systems can access informational content stored at the one or more remote servers, a computer program product for implementing a method of efficiently allocating cache space within the plurality of proxy servers so that requested content is distributively cached at mutually exclusive proxy servers, comprising a computer readable medium for storing executable instructions for implementing the method, and wherein the method comprises acts of:

assigning to each of a plurality of the proxy servers a mutually exclusive range of content to retrieve from one or more remote servers on behalf of one or more client systems and cache;

hashing at least a portion of a request received from a client system for content that is available at one or more particular remote servers;

rather than allowing any arbitrary proxy server to retrieve and cache the requested content, identifying, with at least a portion of the hashed request, at least one proxy server assigned to a particular mutually exclusive range of content that corresponds to the requested content; and at the at least one identified proxy server, examining a local cache for the requested content, and if found in the local cache, sending the requested content to the client system, but if not found in the local cache, retrieving the requested content from the one or more particular remote servers, storing the requested content in the local cache, and sending the requested content to the client system.

25. A computer program product as recited in claim 24, wherein the requested content comprises one or more Web pages, and wherein the request comprises one or more uniform resource locators for the one or more Web pages.

26. A computer program product as recited in claim 24, wherein the act of hashing identifies a cluster of two or more proxy servers collectively assigned to the particular mutually exclusive range of content that corresponds to the requested content, the method further comprising an act of adding any requested content that is received from the one or more particular remote servers to the local cache of each proxy server in the cluster.

27. A computer program product as recited in claim 26, the method further comprising an act of load balancing multiple requests for the requested content among the two or more proxy servers of the cluster.

28. A computer program product as recited in claim 24, wherein the hashing comprises a Message Digest 5 algorithm.

29. A computer program product as recited in claim 24, wherein a central dispatcher receives the request for content and hashes the at least a portion of the request, the method further comprising an act of sending the request to the at least one identified proxy server.

30. A computer program product as recited in claim 24, wherein an initial proxy server receives the request for content, the method further comprising an act of sending the request to the at least one identified proxy server after the initial proxy server searches for the requested content in a local cache and the requested content is not found.

* * * * *

UNITED STATES PATENT AND TRADEMARK OFFICE
CERTIFICATE OF CORRECTION

PATENT NO. : 6,647,421 B1
DATED : November 11, 2003
INVENTOR(S) : Logue et al.

It is certified that error appears in the above-identified patent and that said Letters Patent is hereby corrected as shown below:

Column 1,
Line 54, after "remote" please delete "serves" and insert -- servers --

Column 3,
Line 7, after "shown in" please insert -- the --

Column 6,
Line 37, please insert -- AN EXEMPLARY SITE TRACKING LIST --
Line 57, before "and be" please delete "http:H//www" and insert -- http://www --

Column 8,
Line 12, before "addressed" please delete "as"

Signed and Sealed this

Twenty-first Day of September, 2004

JON W. DUDAS
*Director of the United States Patent and Trademark Office*